United States Patent
Zuo et al.

(10) Patent No.: US 12,162,392 B2
(45) Date of Patent: Dec. 10, 2024

(54) SEAMLESS LEG REST DEVICE FOR AUTOMOBILE SEATS

(71) Applicant: MAGNA SEATING RESEARCH & DEVELOPMENT (CHONGQING) CO., LTD., Chongqing (CN)

(72) Inventors: Jiale Zuo, Shanghai (CN); Lei Xue, Shanghai (CN)

(73) Assignee: MAGNA SEATING RESEARCH & DEVELOPMENT (CHONGQING) CO., LTD., Chongqing (CN)

( * ) Notice: Subject to any disclaimer, the term of this patent is extended or adjusted under 35 U.S.C. 154(b) by 103 days.

(21) Appl. No.: 18/094,400

(22) Filed: Jan. 9, 2023

(65) Prior Publication Data
US 2023/0234488 A1 Jul. 27, 2023

Related U.S. Application Data

(63) Continuation of application No. PCT/CN2022/117028, filed on Sep. 5, 2022.

(30) Foreign Application Priority Data

Jan. 21, 2022 (CN) .......................... 202210071394.4

(51) Int. Cl.
*B60N 2/90* (2018.01)
*A47C 1/034* (2006.01)
*A47C 1/037* (2006.01)
*B60N 2/02* (2006.01)

(52) U.S. Cl.
CPC .............. *B60N 2/995* (2018.02); *A47C 1/034* (2013.01); *A47C 1/0345* (2013.01); *A47C 1/037* (2013.01); *B60N 2/0284* (2013.01)

(58) Field of Classification Search
CPC .... B60N 2/995; B60N 2/0284; A47C 1/0345; A47C 1/034; A47C 1/037
See application file for complete search history.

(56) References Cited

U.S. PATENT DOCUMENTS

| | | | | |
|---|---|---|---|---|
| 6,095,610 A | * | 8/2000 | Okajima ................ | B60N 2/995 297/423.26 |
| 7,866,755 B2 | * | 1/2011 | Okano ................... | B60N 2/995 297/423.26 |
| 7,871,126 B2 | * | 1/2011 | Becker ................. | B60N 2/0284 297/284.11 |
| 7,997,648 B2 | * | 8/2011 | Becker ................. | B60N 2/0284 297/284.11 |
| 8,162,397 B2 | * | 4/2012 | Booth ...................... | B60N 2/62 297/284.3 |
| 8,167,370 B2 | * | 5/2012 | Arakawa .............. | B60N 2/0284 297/284.11 |
| 9,527,418 B2 | * | 12/2016 | Sachs ................... | B60N 2/5642 |

(Continued)

*Primary Examiner* — Syed A Islam (57) ABSTRACT

A seamless leg rest device for automobile seats comprises a middle fixing bracket, side fixing brackets, link assemblies, a rotary driving assembly, a support plate and a telescopic assembly, wherein a front side of the support plate is covered with a foamed cover assembly, a lower end of the foamed cover assembly stretches across the support plate and is then bent backwards, and a tail end of a bent section of the foamed cover assembly is tensioned on the link assemblies through a telescopic return member. Both the angle and the length of a leg rest can be adjusted, and seams are avoided when the leg rest is adjusted.

4 Claims, 5 Drawing Sheets

(56) References Cited

U.S. PATENT DOCUMENTS

| | | | | |
|---|---|---|---|---|
| 9,809,132 | B2* | 11/2017 | Bortolon | B60N 2/62 |
| 9,963,055 | B2* | 5/2018 | Seo | B60N 2/995 |
| 10,118,508 | B2* | 11/2018 | Bowen | A47C 1/0345 |
| 10,625,646 | B2* | 4/2020 | Kondrad | B60N 2/929 |
| 10,640,011 | B2* | 5/2020 | Anzenberger | B60N 2/0284 |
| 10,800,292 | B2* | 10/2020 | Tsukamoto | B60N 2/68 |
| 10,843,612 | B1* | 11/2020 | Casey | B60N 2/995 |
| 10,981,472 | B2* | 4/2021 | Weir | B60N 2/0284 |
| 11,059,407 | B2* | 7/2021 | Tait | B60N 2/0284 |
| 11,548,424 | B2* | 1/2023 | Kim | B60N 2/995 |
| 2019/0308531 | A1* | 10/2019 | Liu | B60N 2/01591 |
| 2024/0067052 | A1* | 2/2024 | Legh | B60N 2/0252 |

* cited by examiner

SEAMLESS LEG REST DEVICE FOR AUTOMOBILE SEATS

BACKGROUND OF THE INVENTION

1. Technical Field

The invention belongs to the technical field of automobile seats, and particularly, relates to a seamless leg rest device for automobile seats.

2. Description of Related Art

To improve the comfort of passengers, the leg rest is disposed on automobile seats, particularly on the passenger seats and rear seats, to support the legs of passengers when the seats are in a lying posture. The improvement of living standards leads to an increasingly higher requirement for the quality of seats, and a leg rest is required to be suitable for passengers of different body shapes and heights and have a better appearance.

Figure 1:
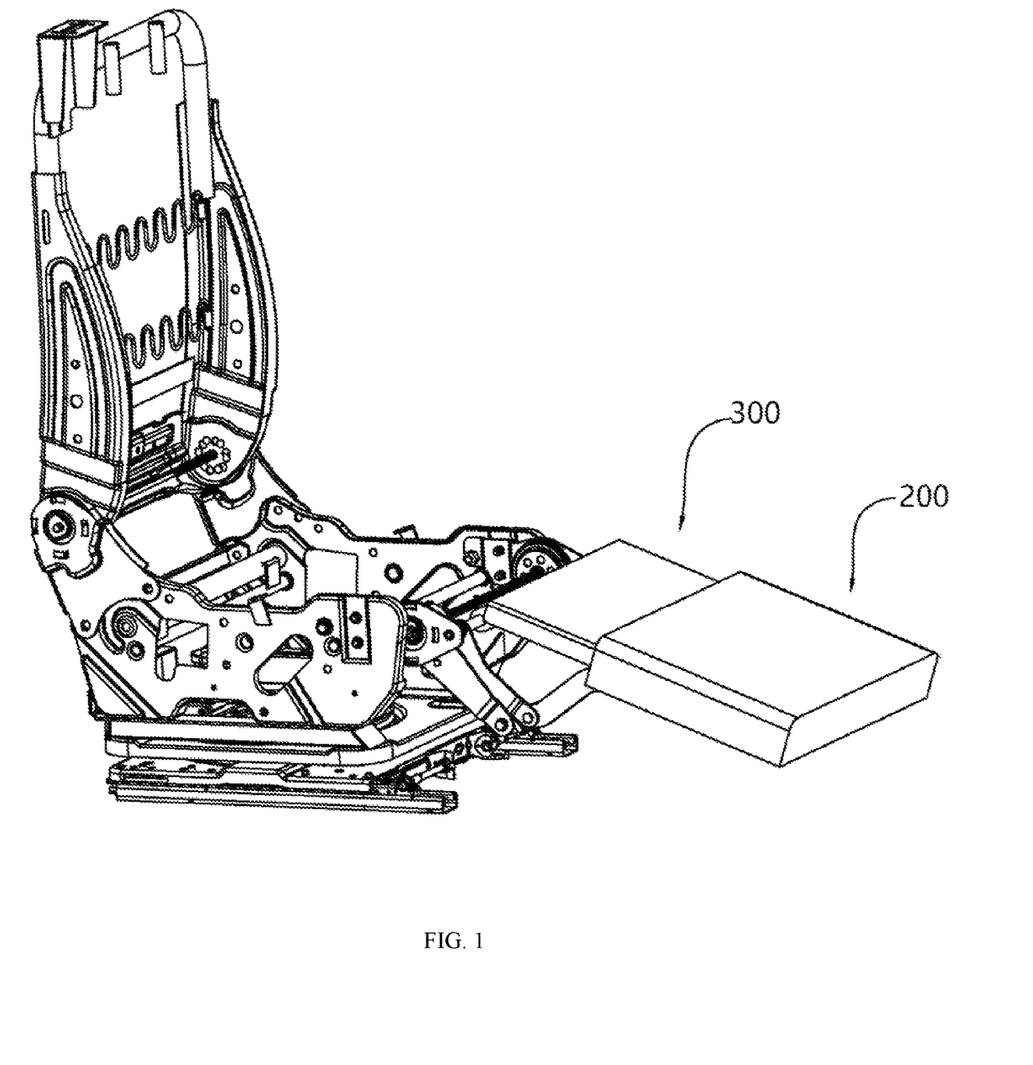
FIG. 1 is a structural view of the prior art.

Chinese Patent No.CN207737150U discloses a seat and a leg rest for the seat. As shown in FIG. 1, when the seat is adjusted backwards, an outer leg rest assembly 200 and an inner leg rest assembly 300 extend out, but seams and steps exist between the inner leg rest assembly 300 and a seat frame, as well as between the inner leg rest assembly 300 and the outer leg rest assembly 200 after the seat is covered, making the appearance of the seat unaesthetic; due to the existence of the seams, hidden dangers (such as finger pinches) may be caused; and the outer leg rest assembly 200 and the inner leg rest assembly 300 are linked and cannot be adjusted independently, thus being unable to meet the requirements of all passengers.

BRIEF SUMMARY OF THE INVENTION

The invention aims to provide a seamless leg rest device for automobile seats, which can adjust the angle and length of a leg rest without generating seams, thus avoiding hidden dangers.

The technical solution adopted by the invention is as follows: a seamless leg rest device for automobile seats comprises a middle fixing bracket disposed below a seat frame assembly, wherein side fixing brackets are forwardly disposed on left and right sides of the middle fixing bracket, rear ends of the two side fixing brackets are connected through a synchronous circular tube which extends left and right, a link assembly which extends forwards is disposed on each side fixing bracket, a support plate is connected to front ends of the two link assemblies, the link assemblies are provided with a rotary driving assembly, a telescopic assembly is disposed on the support plate and is able to slide in parallel with respect to the support plate under the action of a telescopic driving assembly, a front side of the support plate is covered with a foamed cover assembly, an upper end of the foamed cover assembly stretches across the support plate and then extends backwards to be fixed over a front end of the seat frame assembly, a lower end of the foamed cover assembly stretches across the support plate and is then bent backwards, and a tail end of a bent section of the foamed cover assembly is tensioned on the link assemblies through a telescopic return member; when working, the rotary driving assembly drives the support plate through the link assemblies, the telescopic driving assembly, and the telescopic assembly to rotate forward synchronously to lift the lower end of the foamed cover assembly forward, such that the legs of passengers are supported by the foamed cover assembly; when a length of a leg rest needs to be adjusted, the telescopic driving assembly drives a telescopic end of the telescopic assembly to slide in parallel with respect to the support plate, such that the bent section of the lower end of the foamed cover assembly is extended outwardly or retracted inwardly;

Preferably, the upper end and lower end of the foamed cover assembly are identical in width, foamed roller supports are disposed on left and right sides of a lower end of the telescopic end of the telescopic assembly, a foamed roller which guides the front end of the foamed cover assembly when it is extended is disposed between the two foamed roller supports, an elevation roller support rod which tilts backwards is connected to front ends of the two link assemblies, and a foamed elevation roller, which contacts an inner side of the bent section of the foamed cover assembly, is disposed around the elevation roller support rod and is located behind the foamed roller;

Further preferably, each link assembly comprises a driving link, wherein an upper end of the driving link is hinged to a front end of the corresponding side fixing bracket, a first driven link is hinged to a lower end of the driving link, a front end of the first driven link is hinged to the middle of a support link, a second driven link is hinged to an upper end of the support link, the middle of the second driven link is hinged to the middle of the driving link, a connecting link is hinged to a position close to a rear end of the corresponding side fixing bracket, a front end of the connecting link is hinged to a rear end of the second driven link, and the driving link is driven by the rotary driving assembly to rotate; and the support plate is disposed at front ends of the two support links.

Further preferably, the rotary driving assembly comprises a rotary motor, a rotary lead screw extending backwards is disposed at an output end of the rotary motor, a rotary nut is screwed to a rear end of the rotary lead screw and is disposed below the seat frame assembly through a rotary nut holder, the rotary motor is disposed on a driving circular tube which extends left and right through a rotary motor holder, and a left end and a right end of the driving circular tube are disposed on the link assemblies on the corresponding sides respectively Further preferably, the telescopic assembly comprises connecting bolts and a base plate disposed at front ends of the two link assemblies, a telescopic plate located behind the support plate is disposed in front of the base plate, at least two sliding slots are formed in the telescopic plate and are spaced left and right, and the connecting bolts penetrate through the sliding slots to be fixed on the base plate Further preferably, the telescopic driving assembly comprises a fixed telescopic motor, a telescopic lead screw is disposed at an output end of the telescopic motor, and a telescopic nut fixed at the telescopic end of the telescopic assembly is screwed on the telescopic lead screw.

The invention has the following beneficial effects: the link assemblies are driven by the rotary driving assembly to work to rotatably adjust the leg rest, such that the requirements of different passengers for a comfortable angle of the leg rest can be met; the telescopic plate can telescope through the telescopic driving assembly to change the length of the leg rest, so as to meet the requirements of users with different heights and habits; and the foamed cover assembly is disposed on the support plate to avoid seams when rotary adjustment and telescopic adjustment are performed separately, such that hidden dangers are reduced, and the overall aesthetics is improved.

DETAILED DESCRIPTION OF THE INVENTION

The invention will be further explained below in conjunction with the embodiments and accompanying drawings.

As shown in FIG. 1-FIG. 8, this embodiment provides a seamless leg rest device for automobile seats. The leg rest is disposed on a seat frame assembly A. Wherein, the seat frame assembly A is provided with cushion side plates 28, seatback connecting plates 29, a rear horizontal tube 30, elevation toothed plates 31, elevation motor supports 32, elevation motors 33, a front horizontal tube 34, seat basin supports 35 and a seat basin 36, which all belong to the prior art and will no longer be detailed.

Figure 2:
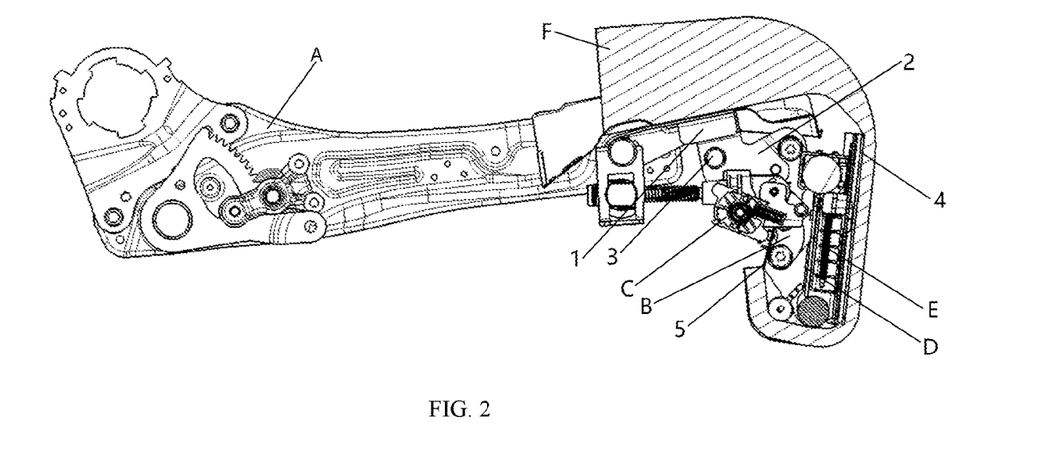
FIG. 2 is a first structural view of the invention.
Figure 3:
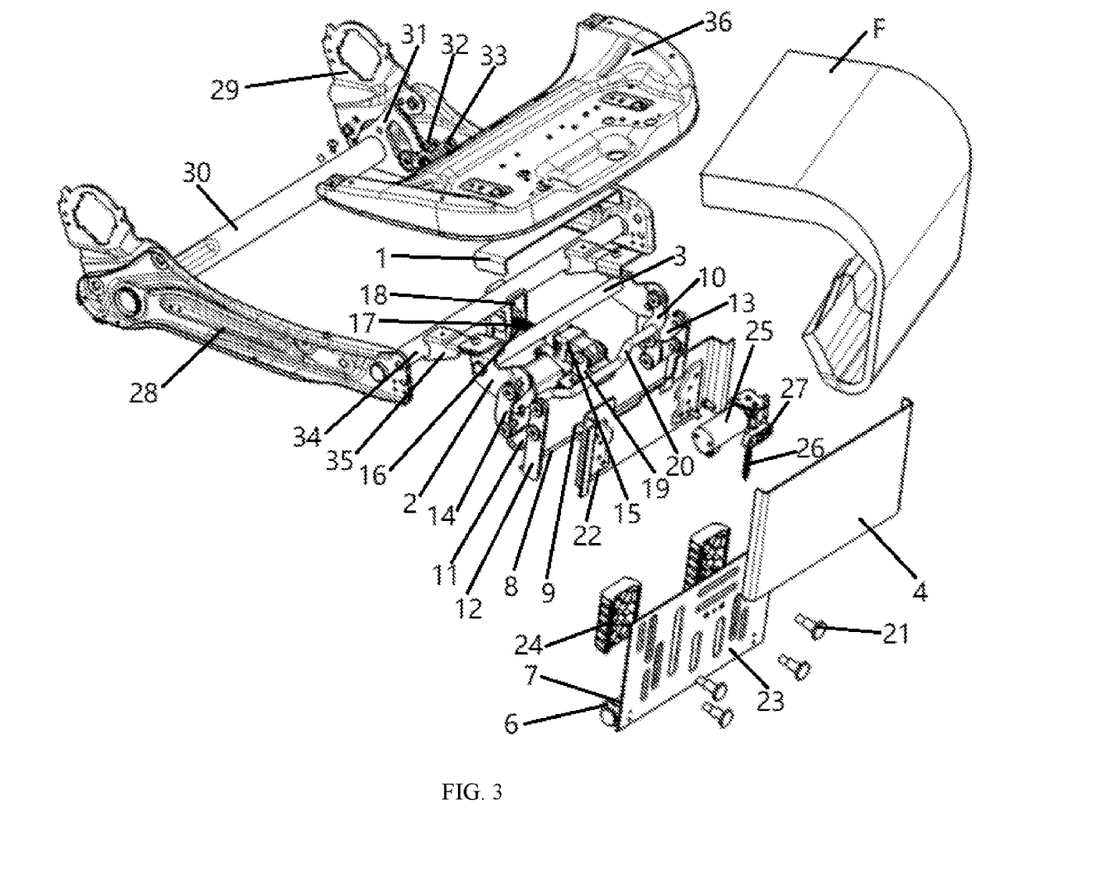
FIG. 3 is an exploded view of the invention.

The leg rest is mainly composed of a middle fixing bracket 1, side fixing brackets 2, a synchronous circular tube 3, a support plate 4, a telescopic return member 5, link assemblies B, a rotary driving assembly C, a telescopic assembly D, a telescopic driving assembly E, and a foamed cover assembly F. Wherein, the middle fixing bracket 1 is disposed below the seat frame assembly A, the side fixing brackets 2 are forwardly disposed on left and right sides of the middle fixing bracket 1, rear ends of the two side fixing brackets 2 are connected through the synchronous circular tube 3 which extends left and right, each side fixing bracket 2 is provided with one link assembly B which extends forwards, the link assemblies B on the left and right sides are arranged oppositely, the support plate 4 is connected to front ends of the two link assemblies B, and the link assemblies B are provided with the rotary driving assembly C.

The telescopic assembly D is disposed on the support plate 4 and is able to slide in parallel with respect to the support plate 4 under the action of the telescopic driving assembly E, a front side of the support plate 4 is covered with the foamed cover assembly F, an upper end of the foamed cover assembly F stretches across the support plate 4 and then extends backwards to be fixed over a front end of the seat frame assembly A, a lower end of the foamed cover assembly F stretches across the support plate 4 and is then bent backwards, and a tail end of a bent section of the foamed cover assembly F is tensioned on the link assemblies B through the telescopic return member 5.

Figure 4:
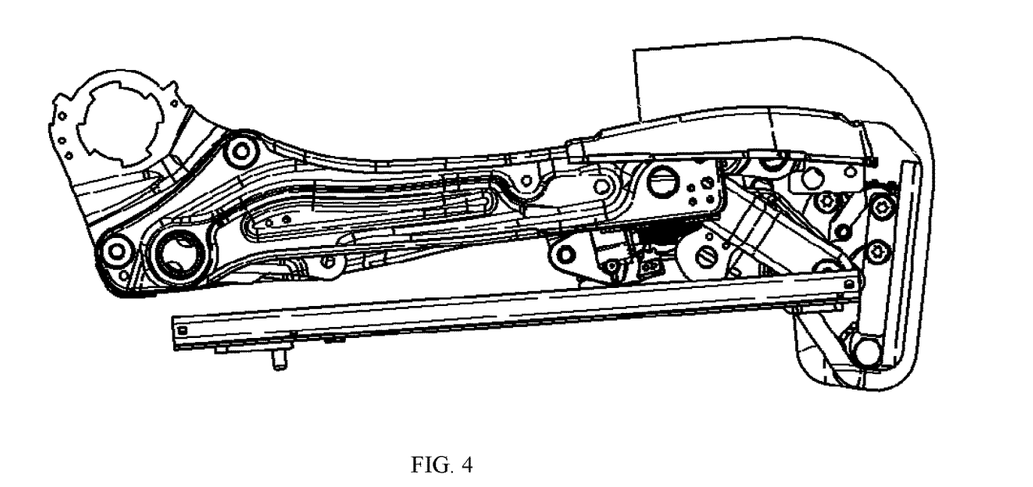
FIG. 4 is a schematic diagram of the invention in a folded state.
Figure 5:
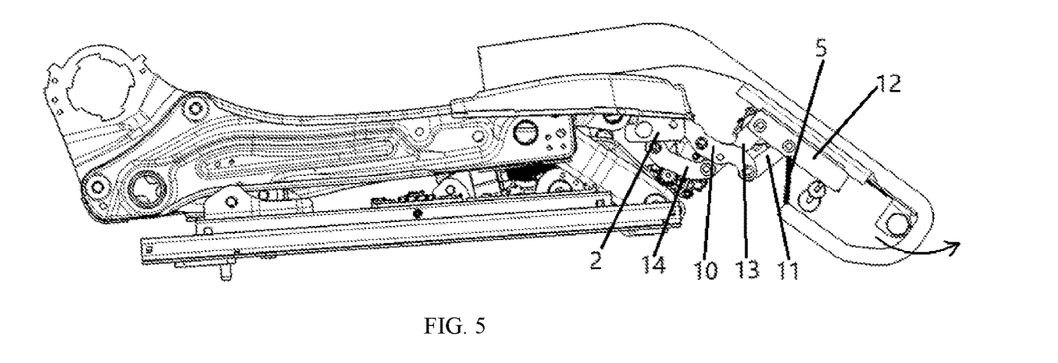
FIG. 5 is a schematic diagram of the invention in an unfolded state (the arrow in this figure is an extension direction of a bent lower end of a foamed cover assembly).
Figure 6:
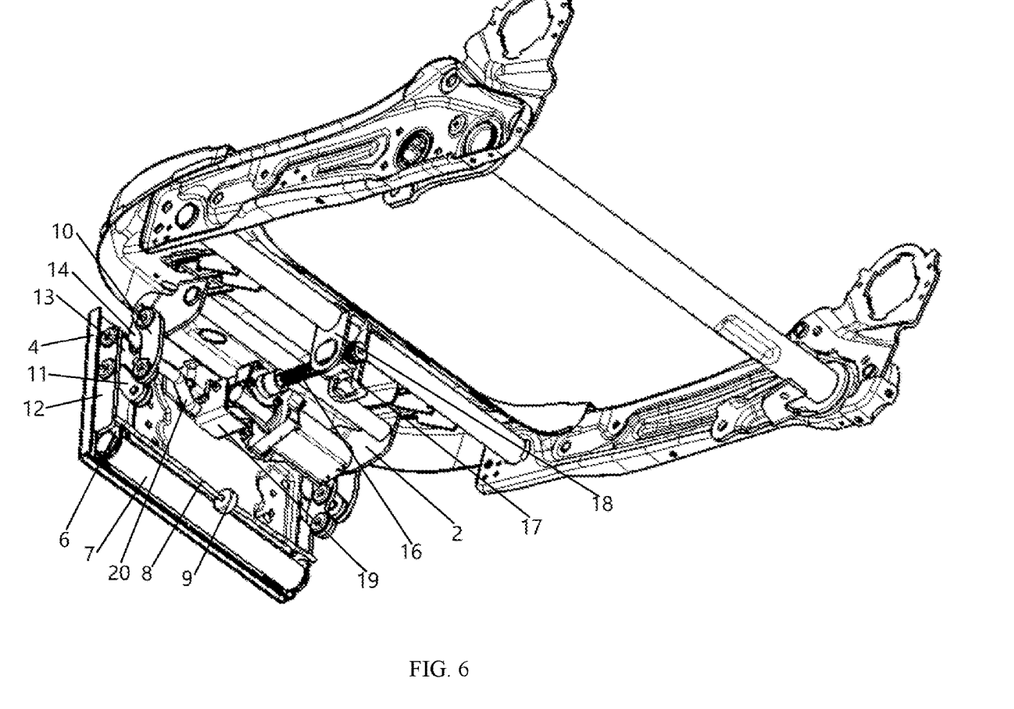
FIG. 6 is a second schematic diagram of the invention.
Figure 7:
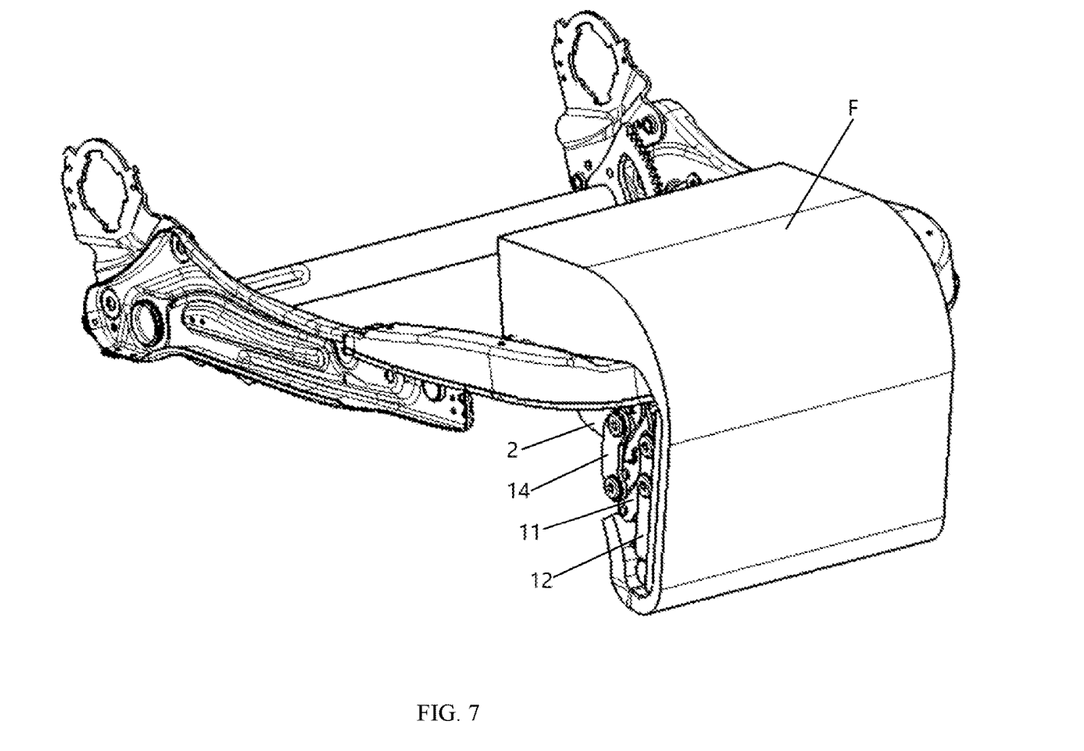
FIG. 7 is a third schematic diagram of the invention.

When working, the rotary driving assembly C drives the support plate 4 through the link assemblies B, the telescopic driving assembly E, and the telescopic assembly D to rotate forward synchronously to lift the lower end of the foamed cover assembly F forward, such that the legs of passengers are supported by the foamed cover assembly F; when the length of a leg rest needs to be adjusted, the telescopic driving assembly E drives a telescopic end of the telescopic assembly D to slide in parallel with respect to the support plate 4, such that the bent section of the lower end of the foamed cover assembly F is extended outwardly or retracted inwardly.

Figure 8:
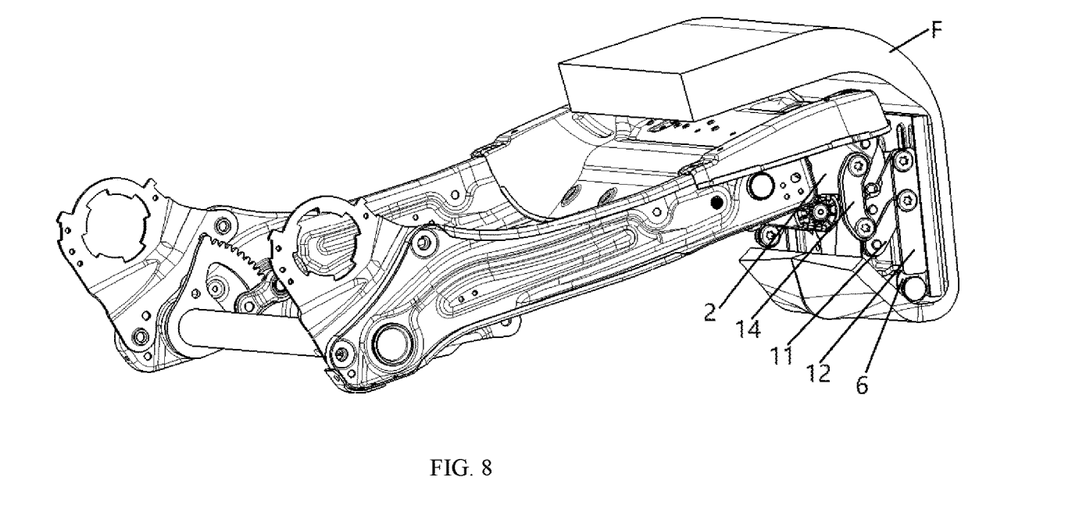
FIG. 8 is a fourth schematic diagram of the invention.

The upper end and lower end of the foamed cover assembly F are identical in width, foamed roller supports 6 are disposed on left and right sides of a lower end of the telescopic end of the telescopic assembly D, a foamed roller 7 which guides the front end of the foamed cover assembly F when it is extended is disposed between the two foamed roller supports 6, the foamed roller 7 is rotatable, an elevation roller support rod 8 which tilts backwards is connected to front ends of the two link assemblies B, and a foamed elevation roller 9, which contacts an inner side of the bent section of the foamed cover assembly F and is able to rotate, is disposed around the elevation roller support rod 8 and is located behind the foamed roller 7. The foamed elevation roller 9 is used for elevating the middle of the bent section of the foamed cover assembly F when the leg rest is retracted backward, as shown in FIG. 8, such that the bent section of the foamed cover assembly F can be retracted below the seat frame assembly; and under the action of the foamed elevation roller 9, the foamed roller 7 can be flattened out when the bent section of the foamed cover assembly F is extended.

Each link assembly B specifically comprises a driving link 10, wherein an upper end of the driving link 10 is hinged to a front end of the corresponding side fixing bracket 2, a first driven link 11 is hinged to a lower end of the driving link 10, a front end of the first driven link 11 is hinged to the middle of a support link 12, a second driven link 13 is hinged to an upper end of the support link 12, the middle of the second driven link 13 is hinged to the middle of the driving link 10, a connecting link 14 is hinged to a position close to a rear end of the corresponding side fixing bracket 2, a front end of the connecting link 14 is hinged to a rear end of the second driven link 13, and the driving link 10 is driven by the rotary driving assembly C to rotate; and the support plate 4 is disposed at front ends of the two support links 12. The driving links 10 are driven by the rotary driving assembly C to move, such that the support links 12 can drive the support plate 4 to rotate.

The rotary driving assembly C specifically comprises a rotary motor 15, wherein a rotary lead screw 16 extending backwards is disposed at an output end of the rotary motor 15, a rotary nut 17 is screwed at a rear end of the rotary lead screw 16 and is disposed below the seat frame assembly A through a rotary nut holder 18, the rotary motor 15 is disposed on a driving circular tube 20 which extends left and right through a rotary motor holder 19, and a left end and a right end of the driving circular tube 20 are disposed on the link assemblies B on the corresponding sides respectively.

The telescopic assembly D specifically comprises connecting bolts 21 and a base plate 22 disposed at front ends of the two link assemblies B, wherein a telescopic plate 23 located behind the support plate 4 is disposed in front of the base plate 22, at least two sliding slots are formed in the telescopic plate 23 and are spaced left and right, the connecting bolts 21 penetrate through the sliding slots to be fixed on the base plate 22, and the foamed roller supports 6 are disposed at a lower end of the telescopic plate 23. To guarantee the support effect between the telescopic plate 23 and the base plate 22, two support blocks 24 are disposed between the telescopic plate 23 and the base plate 22 and are spaced left and right. Bushings are disposed between the sliding slots and the connecting bolts 21, and the length of the sliding slots can be set to limit the telescoping distance of the telescopic plate 23.

The telescopic driving assembly E specifically comprises a telescopic motor 25 fixedly disposed in front of the base plate 22, a telescopic lead screw 26 is disposed at an output end of the telescopic motor 25, and a telescopic nut 26 fixed behind the telescopic plate 23 is screwed on the telescopic lead screw 26.

Preferably, the telescopic return member 5 is an elastic band, which is low in cost and each to change, wherein one end of the elastic band is disposed at the tail end of the bent section of the foamed cover assembly, and the other end of the elastic band is disposed on the driving circular tube. To ensure that the tail end of the bent section of the foamed cover assembly is tensioned, the elastic bands are preferably disposed both on left and right sides of the bent tail ends of the foamed cover assembly F.

To ensure that the foamed elevation roller 9 has a good support effect on the foamed cover assembly F to enable the foamed cover assembly F to be retracted below the seat frame assembly more easily, the angle between the elevation roller support rod 8 and the support plate 4 is 30°-60°. Preferably, the angle between the elevation roller support rod 8 and the support plate 4 is 45°.

In this embodiment, the middle fixing bracket 1 is welded to the middle of the front horizontal tube and is connected to the side fixing brackets 2 through bolts, the synchronous circular tube 3 and the side fixing brackets 2 are fixed by welding, the side fixing brackets 2, the driving links 10, the first driven links 11, the support links 12, the second driven links 13, and the connecting links 14 are hinged through bolts, the driving circular tube 20 is welded between the two driving links 10, welds between the driving circular tube 20 and the driving links 10 are located behind hinge points between the second driven links 13 and the driving links 10, the rotary motor holder 19 is welded to the middle of the driving circular tube 20, the support plate 4 and the base plate 22 are welded to the support links 12, the telescopic motor 25 is installed in front of the base plate 22 through bolts, the telescopic nut 2 is installed on the telescopic plate 23 through a bolt, the foamed roller 7 is hinged to the foamed roller supports 6 through bolts, and the rear end of the foamed cover assembly F is clamped on the seat frame assembly. One end of the elastic band is fixed on the driving circular tube 20 through a ribbon, and the other end of the elastic band is disposed at the tail end of the bent section of the foamed cover assembly F. In this embodiment, by adjusting the length and hinge position of the driving links 10, the first driven links 11, the support links 12, the second driven links 13 and the connecting links 14, the angle of the leg rest can be adjusted within 0-80°; and by adjusting the length of the sliding slots, the length of the leg rest can be adjusted within 0-120 mm.

What is claimed is:

1. A seamless leg rest device for automobile seats, comprising a middle fixing bracket disposed below a seat frame assembly, wherein two side fixing brackets are forwardly disposed on left and right sides of the middle fixing bracket, rear ends of the two side fixing brackets are connected through a synchronous circular tube which extends left and right, a link assembly which extends forwards is disposed on each said side fixing bracket, a support plate is connected to front ends of the two link assemblies, the link assemblies are provided with a rotary driving assembly, a telescopic assembly is disposed on the support plate and is able to slide in parallel with respect to the support plate under the action of a telescopic driving assembly, a front side of the support plate is covered with a foamed cover assembly, an upper end of the foamed cover assembly stretches across the support plate and then extends backwards to be fixed over a front end of the seat frame assembly, a lower end of the foamed cover assembly stretches across the support plate and is then bent backwards, and a tail end of a bent section of the foamed cover assembly is tensioned on the link assemblies through a telescopic return member;

when working, the rotary driving assembly drives the support plate through the link assemblies, the telescopic driving assembly, and the telescopic assembly to rotate forward synchronously to lift the lower end of the foamed cover assembly forward, such that the legs of passengers are supported by the foamed cover assembly; when a length of a leg rest needs to be adjusted, the telescopic driving assembly drives a telescopic end of the telescopic assembly to slide in parallel with respect to the support plate, such that the bent section of the lower end of the foamed cover assembly is extended outwardly or retracted inwardly;

the upper end and lower end of the foamed cover assembly are identical in width, foamed roller supports are disposed on left and right sides of a lower end of the telescopic end of the telescopic assembly, a foamed roller which guides the front end of the foamed cover assembly when it is extended is disposed between the two foamed roller supports, an elevation roller support rod which tilts backwards is connected to front ends of the two link assemblies, and a foamed elevation roller, which contacts an inner side of the bent section of the foamed cover assembly, is disposed around the elevation roller support rod and is located behind the foamed roller;

each said link assembly comprises a driving link, wherein an upper end of the driving link is hinged to a front end of the corresponding side fixing bracket, a first driven link is hinged to a lower end of the driving link, a front end of the first driven link is hinged to a middle of a support link, a second driven link is hinged to an upper end of the support link, a middle of the second driven link is hinged to a middle of the driving link, a connecting link is hinged to a position close to a rear end of the corresponding side fixing bracket, a front end of the connecting link is hinged to a rear end of the second driven link, and the driving link is driven by the rotary driving assembly to rotate; the support plate is disposed at a front end of the support link;

the rotary driving assembly comprises a rotary motor, a rotary lead screw extending backwards is disposed at an output end of the rotary motor, a rotary nut is screwed to a rear end of the rotary lead screw and is disposed below the seat frame assembly through a rotary nut holder, the rotary motor is disposed on a driving circular tube which extends left and right through a rotary motor holder, and a left end and a right end of the driving circular tube are disposed on the link assemblies on the corresponding sides respectively;

the telescopic assembly comprises connecting bolts and a base plate disposed at front ends of the two link assemblies, a telescopic plate located behind the support plate is disposed in front of the base plate, at least two sliding slots are formed in the telescopic plate and are spaced left and right, and the connecting bolts penetrate through the sliding slots to be fixed on the base plate;

the telescopic driving assembly comprises a fixed telescopic motor, a telescopic lead screw is disposed at an output end of the telescopic motor, and a telescopic nut fixed at the telescopic end of the telescopic assembly is screwed on the telescopic lead screw.

2. The seamless leg rest device for automobile seats according to claim 1, wherein the telescopic return member is an elastic band, and the elastic bands are disposed on both left and right sides of the foamed cover assembly.

3. The seamless leg rest device for automobile seats according to claim 1, wherein an angle between the elevation roller support rod and the support plate is 30°-60°.

4. The seamless leg rest device for automobile seats according to claim 3, wherein the angle between the elevation roller support rod and the support plate is 45°.

* * * * *